Jan. 5, 1932.  A. J. WEATHERHEAD, JR  1,839,909
METHOD OF PRODUCING PIPE COUPLINGS
Filed Oct. 28, 1929
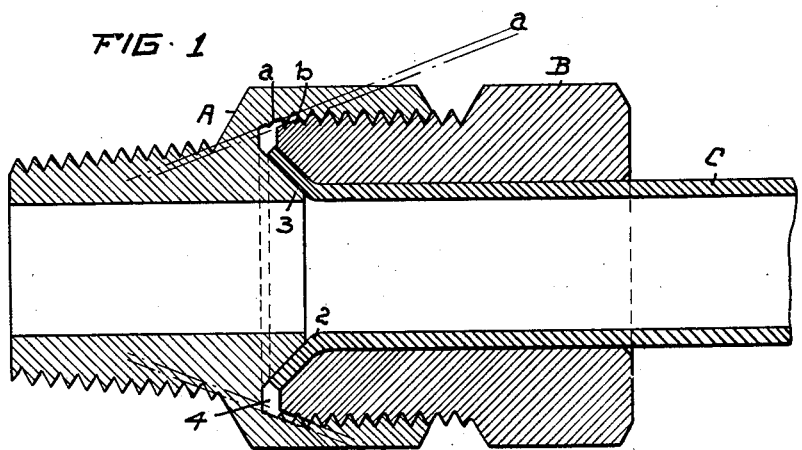
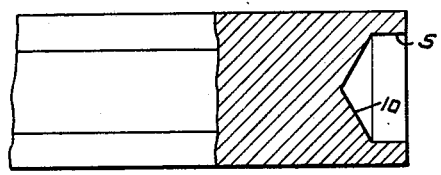
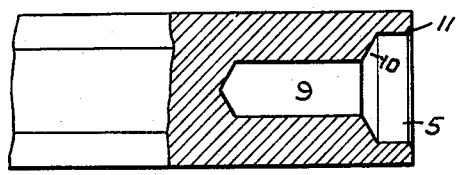
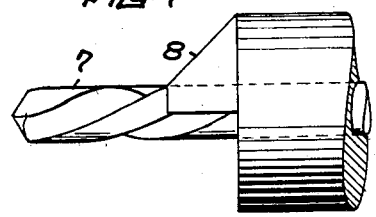
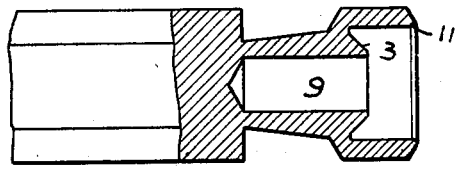
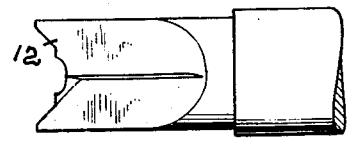
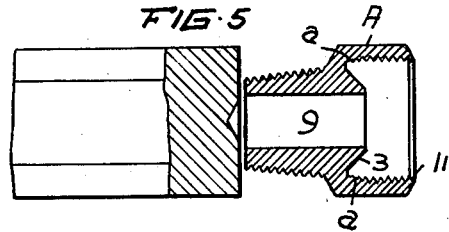
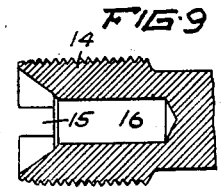
INVENTOR
A. J. WEATHERHEAD JR.
BY
Fisher, Moser & Moore.
ATTORNEY Patented Jan. 5, 1932

1,839,909

UNITED STATES PATENT OFFICE

ALBERT J. WEATHERHEAD, JR., OF CLEVELAND, OHIO

METHOD OF PRODUCING PIPE COUPLINGS

Application filed October 28, 1929. Serial No. 403,101.

My invention relates to a method of producing screw-threaded pipe couplings, especially a pipe coupling of the type and kind shown and claimed in my co-pending application filed December 3, 1928, Serial No. 323,435, and in general my object is to produce such pipe couplings rapidly and efficiently and with a high degree of accuracy, and also cheaply, by practicing the series of steps substantially as hereinafter shown and described and more particularly pointed out in the claims.

In the accompanying drawings, Fig. 1 is a sectional view of a pipe coupling constructed according to the steps of manufacture disclosed herein, and Figs. 2 to 5 inclusive, are side and sectional views of the female coupling member as it appears in its successive stages of production. Figs. 6 to 9 inclusive, are side and sectional views of the several tools employed to carry out the steps of the present method of producing the female member, especially the pipe seating and connecting end of the device.

The coupling device shown in Fig. 1 comprises a tubular female member A and a tubular male member or nut B. These members are particularly constructed to receive and compress the flanged end portion 2 of a soft metal tube or pipe C between the flaring mouth of the nut B and a conical seat 3 at the inner end of a screw-threaded recess or chamber 4 in member A, thereby providing a fluid-tight clamping union for the pipe. To save stock or material, and to reduce the length of the coupling members to a minimum without sacrificing the strength of the threaded union and so that the coupling may be used and coupled and uncoupled in crowded quarters, it has been found desirable to screw-thread the internal wall of the recess inwardly beyond the apex or truncated end of conical seat 3, thereby permitting the tubular nut B to be entered deeply into the recess should the need arise in compressing the pipe flange.

In producing coupling members of that kind and type rapidly and inexpensively by automatic screw-machine operations, the problem is to produce perfect screw-threads, to prevent frequent breaking of the taps, and to avoid mal-formation of the conical seat. A further matter to consider is the production of a suitable formation at the inner end of the screw-threaded recess, and on the tip of the nut, to prevent mal-formation of the complementary screw-threads in coupling and uncoupling operations, it being understood that the coupling members are designed to permit repeated coupling and uncoupling operations with ease and convenience and without impairment of the fluid-tight sealing relations. The female and male members are therefore particularly constructed or formed with tapered or beveled surfaces, the internal screw-threaded wall of the recess 4 in the female member A being tapered annularly at $a$ opposite the cone or inclined seating surface 3, and the nose or tip $b$ of the screw-threaded nut or male member B being tapered or beveled annularly to correspond substantially or exactly to the tapered surface $a$, so that when the nut is introduced into the mouth of the female member the screw-threads may engage readily, and when the nut is entered to nearly its full depth within the recess and brought to bear against the pipe flange that a substantial space or clearance will always be present between such tapered surfaces, whereby the parts will not jamb and interlock adjacent the cone, providing the tip or nose of the nut should expand under excessive stress applied to the nut in screwing it home. The angle of inclination of cone seat 3 is preferably about 45° to prevent any substantial yield or distortion of the cone under normal clamping pressures. The angle of inclination of the cone seat being relatively steep, tight interlocking between the working faces of the screw-threads is effected to prevent the coupling members from self-release under continued vibration or jar, and inasmuch as the tapered screw-threaded surfaces are spaced apart or have clearance opposite the conical seat 3 no jambing takes place between them, and the nut may be screwed into and out of the screw-threaded recess repeatedly, without mutilating the screw-threads or causing undue bind. This result is further fostered by extending the screw-threads into and over the tapered surfaces a and b in the female member A and the male member B, respectively. Thus, it will be noted that the screw-threads within the tapered inner end of recess 4 of female member A are of graduated depth, and the ends of the screw-threads on the tip or nose of the male member B are beveled or chamfered to correspond, so that when the pipe flange is clamped between conical seat 3 and the flaring mouth of nut B, the nut may be screwed inwardly without bringing the tapered surfaces into contact.

In producing the coupling members by automatic screw-machine operations, a brass rod of angular cross section, for example, hexagonal, is fed through the machine to a series of cutting tools which bore, tap and finish the end of the rod while it is revolving. These tools are brought into engaging position with the revolving stock successively, and the finished product cut off from the rod automatically. The successive operations proceed very rapidly, and include the step of boring chamber 4 in body member A to a predetermined depth, and the forming of cone 3 at the bottom of the cavity or chamber. The smoothly finished wall of this cavity or chamber is then tapped or screw-threaded its full length, begining at the open outer end of the chamber and terminating at the bottom opposite the base of the cone. In this proceeding the smooth area opposite the cone is screw-threaded in graduated degree by a tap having a tapered or chamfered end of greater length or approximately the same length as the cone. Several graduated screw-threads are thereby produced in the wall adjacent the bottom of the chamber, and the base line a—a of the graduated screw-threads is inclined reversely to the sides of the cone. Obviously the tap used for that purpose must also be recessed at its end so that screw-threading operations can progress to the extreme bottom of the chamber without injury to the cone.

Having a female coupling member constructed as described, a companion male coupling member is provided by automatic screw-machine operation which involve the feeding of a hexagonal brass rod to a series of cutting and screw-threading tools. Thus, the rod is turned down in part to provide a round, cylindrical extension which is straight for its major length and also chamfered or beveled at its end at an obtuse angle to the axis. The degree of angle of the chamfer or bevel is the same or approximately the same as the graduated screw-threaded portion at the bottom of the cavity in the several figures of the drawings. Therefore, in the next step of producing the male coupling member or nut B, which steps consists in cutting or rolling V-shaped screw-threads in the chamfered end and lengthwise in the straight cylindrical portion, a number of the threads at the end of the nut are graduated on the same lines as the graduated threads in the wall of chamber 4 opposite cone 3. The operations include drilling or boring of the rod axially, and the forming of a flared entrance, before severing the finished article with a hexagonal head from the rod.

The steps taken to produce female member A include, first, drilling of the rod stock axially to a predetermined depth to produce a smoothly-finished chamber 5, using a drill or boring tool 6 of a diameter substantially equal to the diameter of the recess 4 to be used in the finished product. However, drilling at this stage is incomplete and to a lesser depth than the recess is to have eventually in the finished product, see Figs. 2 and 6.

The second step taken involves the use of a smaller drill or boring tool 7 and a chamfering tool 8. These two tools are introduced together into the partially drilled chamber 5, the drill 7 forming an axial bore 9 to a substantial depth within the solid stock beyond the conical bottom 10 formed by the first boring tool 6. When drill 7 reaches a predetermined depth, the chamfering tool 8 bevels the corner 11 at the mouth of chamber 5, see Figs. 3 and 7.

The next step in operations consists in extending chamber 5 partly to a greater depth, and in forming the conical seat 3 at the bottom of chamber 5, using a single cutting and finishing tool 12 for that purpose. This tool deepens chamber 5 uniformly to the same diameter and at the same time cuts and smoothly finishes the stock around the mouth of bore 9 to form the forwardly-projecting cone or conical seat 3, see Figs. 4 and 8.

The fourth step consists in tapping the internal wall of chamber 5 to its extreme bottom inwardly beyond the truncated end of cone 3, and in so doing form one or more spiral screw-threads of gradually varying depth in the wall annularly surrounding the cone. This is accomplished by employing a special fluted tap or screw-threading tool 14 having radial slots 15 and a cavity 16 at one end, and beveled or chamfered externally at an angle at its end to produce the tapering surface a and screw-threads of graduated depth in the annular wall or area surrounding cone 3. Accordingly, tapping proceeds to the bottom of the recess and base of the cone without malformation or injury to the conical seating surface and without undue strain on the tap, and the chamfered corner 11 at the mouth of the recess centers and leads the tap and promotes accurate and rapid operations.

When the foregoing operations are completed, the section of the rod operated upon is severed from the main body. Other operations may proceed externally of the stock, either during the foregoing operations, or subsequently, and the external shape and form of the member may be fashioned to meet the varying requirements and to provide fittings or bodies of any desired shape or form externally.

The complementary male coupling member or tubular nut B is also produced by automatic screw machine operations, being shaped externally and internally to the desired form herein described while it is still an integral part of the solid hexagonal rod fed through the machine, and then severing it from the rod. The steps taken to produce the nut include the turning of a section of the rod into a smoothly finished cylindrical form to the same diameter as the screw-threaded chamber 4 in member A, and chamfering or beveling the tip or nose of this cylindrical part or section to correspond to the tapered surface within the bottom of the screw-threaded chamber in the female member. Complementary screw-threads are then cut or rolled in this cylindrical part or section, including the tapered tip or chamfered nose of the nut, thereby producing a screw-thread of the same pitch but of graduated width and height at the beveled end of the nut adapted to co-act with the correspondingly shaped screw-threads in the tapered inner end of chamber 4 so that a clearance is always present between the assembled members adjacent the cone 3 when a flanged pipe is clamped therebetween, see Fig. 1.

What I claim, is:

1. A method of producing pipe couplings, which consists first, in boring a passage and a circular chamber within a solid body, in extending said chamber and forming a seating cone at the bottom thereof, in introducing a tapered tap into said chamber and screw-threading the wall thereof to the bottom of said chamber; and secondly, in forming complementary screw-threads externally of a tubular male coupling member and chamfering the threaded end thereof to prevent mutilation and binding at the screw-threads in the wall of said first coupling member opposite the seating cone therein.

2. A method of producing pipe couplings, consisting in boring a solid body to a predetermined depth and diameter, in drilling a second smaller opening axially beyond the first opening, in extending the first and larger opening to a greater depth and forming a conical seat surrounding the entrance to the smaller opening, and in screw-threading the internal wall of the larger opening and forming a tapering surface in said threaded wall annularly opposite said conical seat.

3. A method of producing pipe couplings, consisting in boring a solid body to a predetermined depth and diameter; in drilling a smaller opening an increasing distance axially in the bottom of said bore; in re-shaping the bottom of the larger opening to provide a seating cone at the entrance of the smaller opening; in forming a flaring mouth at the front end of the larger opening; in screw-threading the internal wall of said larger opening to the inner end thereof; and in tapering the inner end of the screw-threaded opening on converging lines and reversely to the angle of inclination of the seating cone.

4. A method of producing pipe couplings, consisting in boring a section axially to a predetermined depth and diameter; drilling a smaller opening axially and extending from said first bore; beveling the corner at the mouth of the larger opening; boring the larger opening an increasing distance and forming a conical seat at the entrance of the smaller opening; tapping the internal wall of the larger opening from its beveled mouth to its bottom and in so doing forming a screw-thread of gradually varying depth in said wall annularly opposite said conical seat.

5. A method of producing pipe couplings, consisting in boring a solid body to a predetermined depth and diameter, in drilling a second smaller opening axially beyond the first opening, in extending the first and larger opening to a greater depth, while forming a conical seat surrounding the entrance to the smaller opening and finishing the truncated edge of said conical seat, and in screw-threading the internal wall of the larger opening to the bottom thereof.

In testimony whereof I affix my signature.

ALBERT J. WEATHERHEAD, Jr.